June 24, 1969     F. C. JAMES     3,451,485
ONION HARVESTING MACHINE
Filed May 5, 1966     Sheet 1 of 4
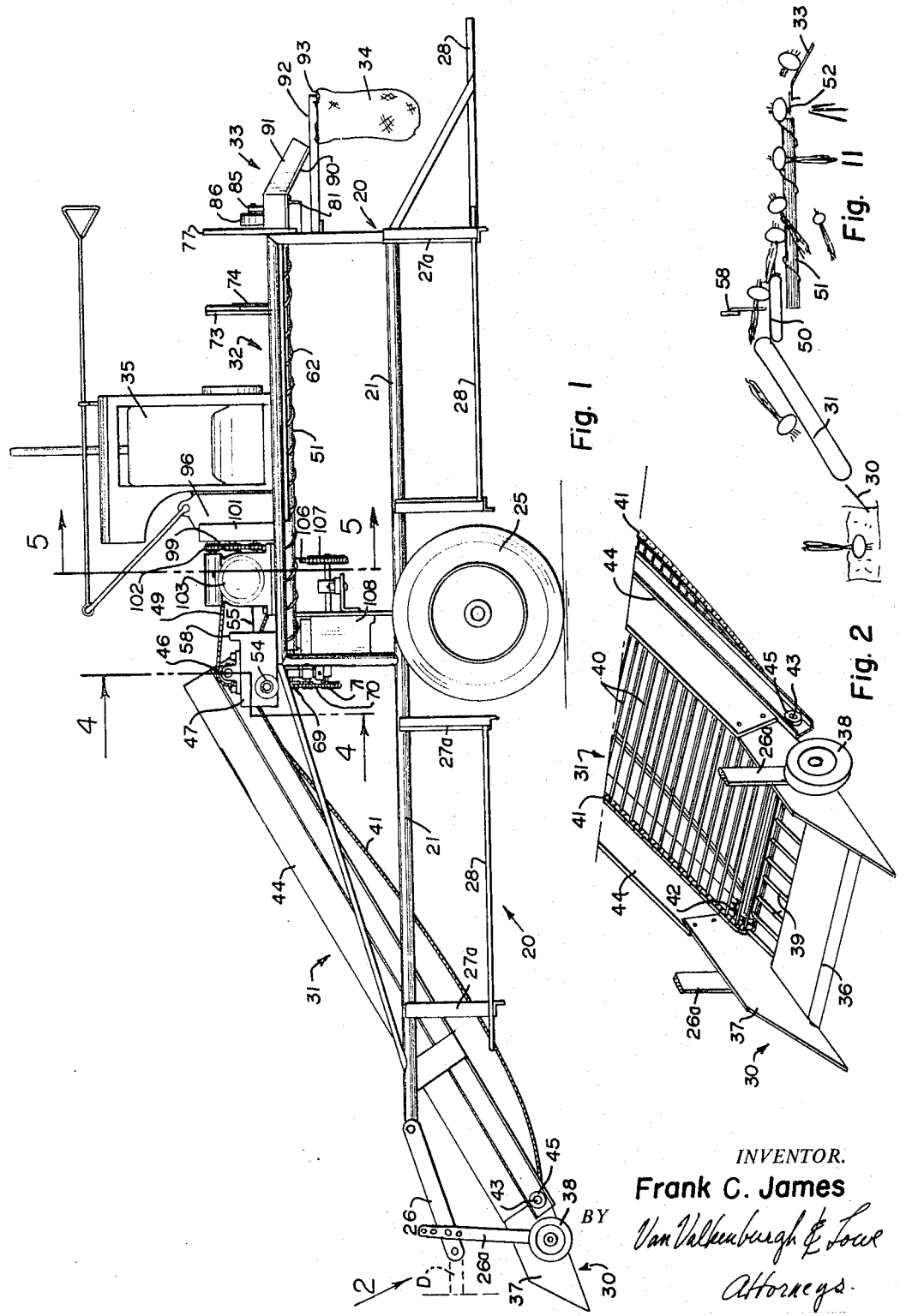
INVENTOR.
Frank C. James INVENTOR.
Frank C. James
BY
Van Valkenburgh & Lowe
attorneys.

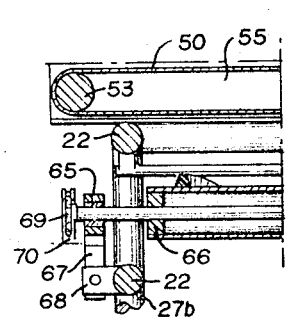
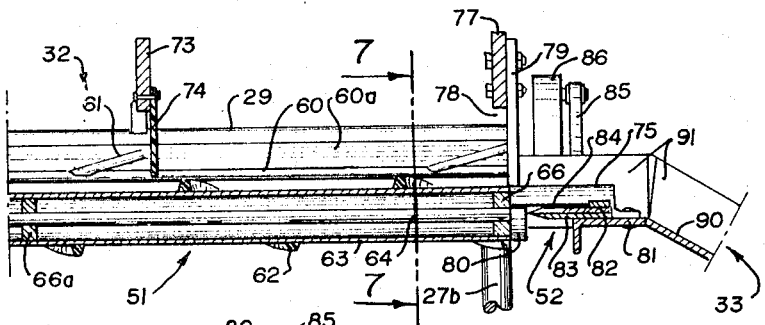
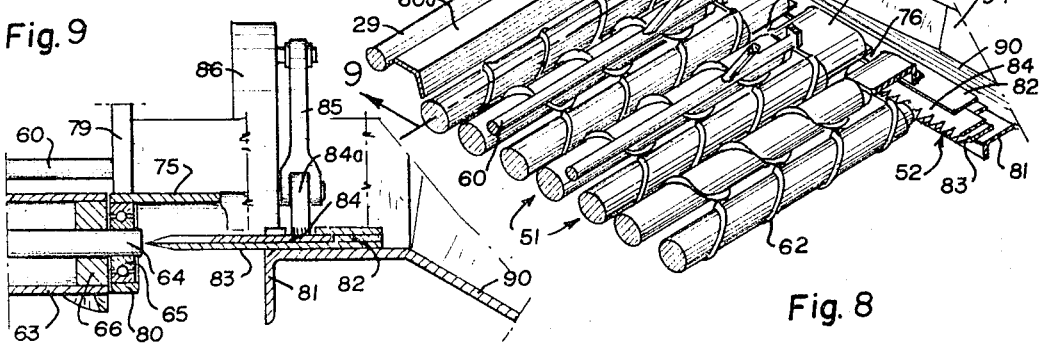
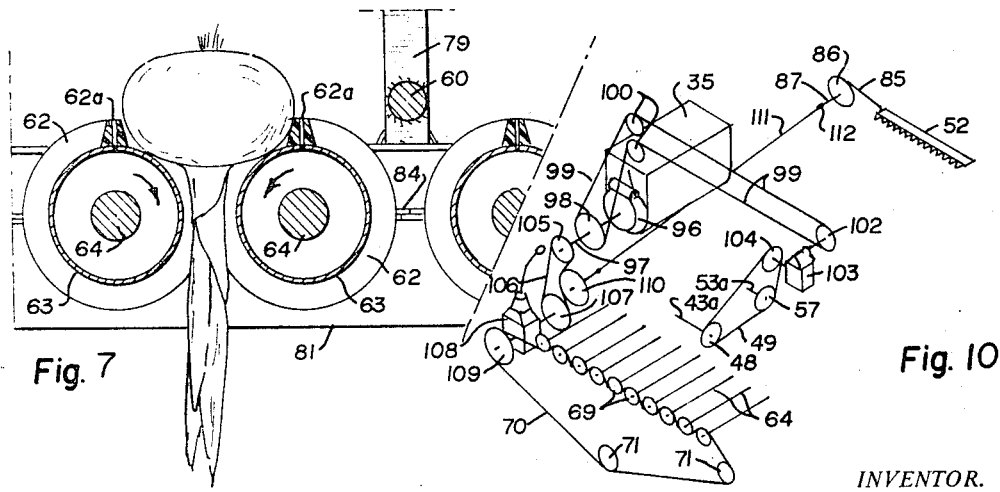

United States Patent Office 3,451,485
Patented June 24, 1969

3,451,485
ONION HARVESTING MACHINE
Frank C. James, Salem, N. Mex., assignor to Wyolt Corporation, Cheyennne, Wyo., a corporation of Wyoming
Filed May 5, 1966, Ser. No. 547,853
Int. Cl. A01d 23/04, 27/00
U.S. Cl. 171—36   5 Claims

ABSTRACT OF THE DISCLOSURE

An onion harvesting apparatus having a short transport belt whereon freshly dug onions are deposited. A transverse array of fingers over this belt arranges the onions moving thereon with their tops in a direction trailing their movement. A finishing table, formed as a series of spiralled rolls, shifts the onions falling from the conveyor across the table with the tops being pulled downwardly between the rolls. A cutter at the end of the spiral rolls cuts the tops from the onions to drop them into a bagging chute located beyond the cutter. The spirals on the rolls of the finishing table are of resilient material to prevent damaging the onions.

---

This invention relates to harvesting machinery for row crops and more particularly to harvesting machinery for onions, a primary object of the invention being to provide a novel and improved harvesting machine which combines the operations of cleaning, culling, topping and bagging onions for their ultimate shipment.

The harvesting of onions, whether a hand or a machine operation, is usually best performed when the bulbs are mature and the stalks are wilted. Machinery is often used to facilitate the harvesting of mature onions. However, onions can also be harvested before they fully mature as long as the bulbs are of an acceptable size and are firm. This is desirable when the earlier crop brings a better price on the market. An earlier harvest may also be necessary because of unexpected weather conditions, for example, when a crop is approaching maturity, an unexpected and excessive rainfall can cause the onions to rot in the ground.

The present invention, an onion harvesting machine, was conceived and developed for harvesting onions before the plants become fully mature and at a time when the plants still have firm, upstanding leaves and stalks. Such onions are much harder to harvest and care for. The stems, though firm, are wet and tend to bleed when the plants are not carefully handled. When it is necessary to harvest onions before they are fully mature, it is a common practice in northern states to first dig them and permit them to dry for a few days before cutting the stems. However, such is not possible in southern states such as Texas and Arizona because the freshly dug onions will sunburn even with a few hours exposure and are then not acceptable for market. In such hot sun-exposed regions, the harvesting of onions before they mature must be by manual operations with laborers topping and sacking the onions as fast as they are dug.

Where a crop must be harvested before the onions are fully mature, because of unexpected wet weather, not only is it desirable to handle the crop as fast as possible, even though this may be quite difficult, but also, it is necessary to remove mud and soil clinging to the bulbs. This requires considerable extra labor and it can substantially reduce the value of the crop.

Accordingly, an object of the present invention is to provide a novel and improved onion harvesting machine which is especially adapted to handle onions before they are fully mature.

Another object of the invention is to provide a novel and improved onion harvesting machine which is capable of digging, transporting, cleaning and topping the onions as they are dug with the tops being disposed below the onion bulbs as they move through the machine to be cut from the bulbs and to drop away from the machine without creating a messy, wet condition ordinarily occurring when onion tops are cut before they are dried and wilted.

Another object of the invention is to provide, in an onion harvesting machine, an arrangement of components which effectively move onion bulbs through the machine and at the same time clean dirt and mud from the plants, eliminate rocks, reject soft and undersized bulbs and break up the double bulbs, and deliver properly sized, firm, topped onions to a sacking chute.

A further object of the invention is to provide a novel and improved onion harvesting machine wherein certain components which carry the onions vibrate in such a manner as to clean the onion bulbs of mud and soil particles, disperse and eliminate small rocks, and permit large rocks to be conveyed through the machine without causing any damage to the machine.

Further objects of the invention are to provide in an onion harvesting machine, a simply designed, easily operated, low-cost rugged and durable arrangement of components designed as either a tractor-drawn trailer-mounted unit or a self-mobile unit.

With the foregoing and other objects in view, all of which more fully hereinafter appear, my invention comprises certain combinations, constructions and arrangements of elements and parts as herein described, defined in the appended claims and illustrated in the accompanying drawing, in which:

FIGURE 1 is a side elevational view of a preferred form of the onion harvester apparatus, with broken lines indicating a connective hitch to a tractor for towing of the unit.

FIGURE 2 is a fragmentary perspective view of the digging head of the apparatus of the front portion of the conveyor, as taken substantially from the indicated arrow 2 at FIG. 1, but on an enlarged scale.

FIGURE 6 is a fragmentary sectional view as taken from the indicated line 6—6 at FIG. 3 but on a further enlarged scale.

FIGURE 7 is a fragmentary sectional view as taken from the indicated line 7—7 at FIG. 6 but on a further enlarged scale and with an onion in position in the rolls.

FIGURE 8 is a fragmentary isometric view of the trailing end of the finishing table with certain portions being in section and other portions being broken away to parts otherwise hidden from view.

FIGURE 9 is a fragmentary sectional detail as taken substantially from the indicated line 9—9 at FIG. 8 but with portions being broken away to show parts otherwise hidden from view.

FIGURE 10 is an isometric diagrammatic view of the driving system of the various components of the apparatus.

FIGURE 11 is a diagrammatic view indicating various positions of onions as they pass through the apparatus.

Figure 3:
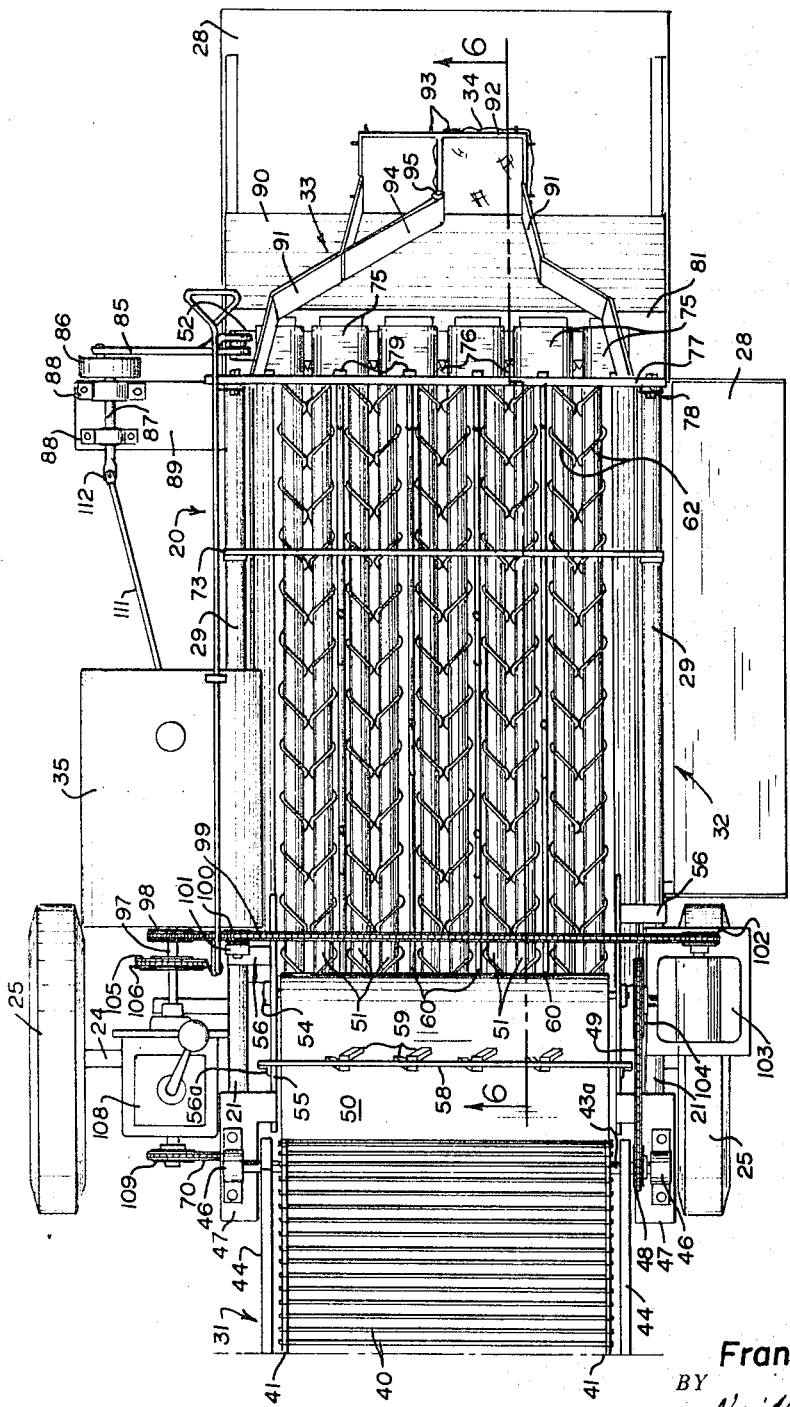
FIGURE 3 is a fragmentary plan view of the apparatus, including the discharge end of the conveyor, the finishing table and the sacking chute.

Referring more particularly to the drawing, the onion harvesting machine may be constructed as a unitary wheel-mounted, tractor-drawn trailer-type vehicle as illustrated. This vehicle may be modified to be self-mobile without changing the basic features of the unit, and accordingly, such a construction is not illustrated or described.

The machine is formed upon a frame 20 of suitable structural tubes, angles or bearing members welded or otherwise fastened together. It includes a primary frame section formed by a pair of longitudinal structural bars 21 separated by suitable transverse spacers 22, the frame section extending, longitudinally, substantially the length of the apparatus. Wheel-mount brackets 23, short channel beam sections, depend from these longitudinal members 21 near the center of the unit to hold a transverse axle shaft 24 of a pair of support wheels 25. A pivoted connector pull link 26 extends forwardly from each longitudinal member 21 for connection with a tractor drawbar D, as indicated in broken lines at FIG. 1. Each link 26, pivoted to its member 21, is adapted to be elevationally adjustable by a holding strap 26a at its outer end, as hereinafter further described.

Suitably struts upstand, depend and outstand from this longitudinally disposed, rectangular support frame to support the several operable components which constitute the apparatus. A first group of struts 27a depend from the longitudinal bars 21 to support platforms 28 at the sides and at the rear or trailing end of the frame at an elevation which is convenient for workmen to ride the apparatus as it is in motion and to watch and monitor the movement of onions passing through it. Also, struts 27b upstand from this support frame to hold a second open rectangular framework 29 where a finishing table and other components of the machine are mounted, as will be further described.

The onions are dug from the ground by a digger 30 at the leading end of the apparatus. This digger, by its forward movement through the ground, pushes the onions onto a conveyor 31 which transports them upwardly and towards the trailing end of the unit. The onions fall from the conveyor and onto a finishing table 32 where they continue to move rearwardly across the table 32 towards the trailing end of the unit and in the course of this movement on the finishing table they are aligned, culled, cleaned, topped and deposited onto a sacking chute 33, and finally into sacks 34 at the trailing end of the apparatus. The conveyor and the elements on the alignment table must be operated and the apparatus includes a suitable power unit for this purpose, preferably a gasoline engine 35 mounted upon brackets 27c at one side upon the rectangular frame to connect with the several mechanical systems which are required, all as will be hereinafter described in detail.

The digger 30 at the leading end of the apparatus may be one of several conventional types, capable of digging planted onions. The apparatus illustrated is especially adapted to dig onions from prepared rows, and the digger head is formed as a flat, transverse moldboard 36 mounted between spaced side plates 37. This unit, secured to the lower end of the conveyor 31 is adapted to be pulled through a row of onion bulbs with a force sufficient to lift and slide the prism of earth along the row wherein the onions lie, onto the moldboard. The earth moves rearwardly on this moldboard and suitable gage wheels 38 are provided at each side plate 37 to restrict the depth at which the unit will cut into the ground. A plurality of spaced fingers 39 extend from the trailing edge of the moldboard. The bulk of the prism of soil moving onto the moldboard will fall back to the earth through these fingers while the onions will be pushed onto the conveyor 31 to continue their rearward movement towards the trailing edge of the apparatus.

This conveyor 31, essentially a conventional unit, is formed as an endless belt of transversely disposed, spaced-apart rods 40 carried between side chains 41. This endless belt is mounted upon suitable sprockets 42 on shafts 43 at each end of the conveyor. The body and frame of the conveyor is formed as a pair of longitudinally-disposed sideboards 44 rigidly held apart by transverse spacers, not shown, and securely mounted onto the frame as by mounting straps and also by the upper shaft 43a. That shaft 43a is attached to the sideboards by bearings 45, and extends from each side of the sideboards to be mounted in support bearings 46 which in turn are held by brackets 47 secured to the frame on the frame members. A sprocket 48 is mounted upon one of the side extensions of this shaft to connect with a chain 49 connecting with mechanisms hereinafter described.

As onions are piled on the conveyor 31 by the digger 30, a substantial portion of the earth will fall through the digger fingers 39 as mentioned. However, some of the earth will be pushed upon the conveyor along with the onions. The upward movement of the conveyor will be accompanied by a certain amount of shaking and vibration which will tend to break up soil clods and practically all of the remaining soil will drop through the spaces between the rods forming the conveyor. Also, undersize onions will drop through the conveyor, such an operation forming a first step in cleaning and culling a crop of onions being harvested. Thus, all onions being lifted by the conveyor will drop onto the finishing table at the top of the machine rearwardly of the table substantially clean and free of soil.

The finishing table 32 includes a short transport belt 50 which receives onions dropping from the conveyor. The onions move rearwardly on this belt to fall upon a table-like array of longitudinally-disposed, spiraled alignment ralls 51 which function in opposing pairs to move the onions rearwardly and at the same time shift the onions to turn the tops downwardly. The inverted onions moving rearwardly upon the rolls 51 are pushed against a sickle cutter 52 which severs the tops to permit them to drop to the ground while the onions move from the table and onto the sacker chute 33.

The transport belt 50 is a short span fabric belt having a width substantially the same as that of the conveyor belt. It is mounted upon a pair of spaced, transverse rollers 53. The shafts of these rollers are held by bearings 54 which, in turn, are carried in upstanding side plates 55 mounted upon the framework 29 by the brackets 47 and other suitable brackets 56. The leading end of this belt is located underneath the discharge end of the conveyor while its trailing end is positioned rearwardly of the conveyor. An extension of the shaft 53a of the roller 53 at the trailing end of the belt carries a sprocket 57 which connects with the drive chain 49 to move in unison with the conveyor, also connected to that chain.

A comb 58 is formed as a flat bar transversely suspended over the transport belt 50 by brackets 56a includes sets of moderately flexible fingers 59 which depend therefrom to contact the belt. As onions drop onto this belt and are moved towards the trailing end of the table 32, the tops of most of the onions are contacted by the fingers and are turned toward the leading end of the apparatus, that is, in a rearward direction with respect to the movement of the onions themselves. Also, the fingers are spaced transversely across the belt in a manner which permits the onions to be deflected and directed between selected pairs of alignment rolls 51 to be more quickly positioned and held in the alignment rolls.

The longitudinally disposed alignment rolls 51 lie in spaced parallelism and in pairs across the open framework portion 29 as a flat table-like structure. Each roll of each pair is closely adjacent to its mate and the two are adapted to rotate in opposite directions, inwardly and downwardly as in the direction of the indicated arrows at FIG. 7 to pull onions into the trough between them. On the other hand, each trough between the rolls of adjacent pairs is blocked by a longitudinal deflector rod 60 mounted over the trough and extending parallel to the rolls the length of thte table, the rods 60 preventing onions from falling into those troughs. Each deflector rod 60 is also provided with several upstanding rearwardly inclined fingers 61 which function to turn the onion tops to trail the movement of the onion bulbs to better position the onions so that their tops may be pulled downwardly through the trough portions between a pair of rolls. In addition to the deflector rods 60, an inclined deflector surface 60a extends inwardly from each side frame member 29 and adjacent to an alignment roll to deflect onions which may happen to fall against the side framework members 29.

Each roll is formed with a spiral 62 and the direction of spiral of one roll is the opposite to that of its mate, with the arrangement of each pair being such that an onion falling in the trough between the mating rolls will be moved towards the trailing end of the apparatus by the spirals. This inward, downward rotation of each pair of the spiraled rolls, heretofore mentioned, not only moves the onion bulbs rearwardly in the trough between the rolls but also pulls the stems of the bulbs downwardly through the trough to a hanging or depending position where the onion bulbs remain until they pass completely across the finishing table to the cutting sickle 52.

Each roll 53 is formed as a hollow metal tube 63 having a comparatively thin wall. This tube is supported upon a shaft 64 extending through the roll tube 63 with projections at each end being supported in bearings 65. A washer shaped disc 66 at each end of each tube 63 holds the tube in an axial alignment upon its shaft 64 and if desired, a similar disc 66a may be used as an intermediate support. The spiral 62, mounted upon each tube 63 is preferably a continuous strip of resilient V-belting which is easily wrapped about the tube and secured thereto, as by any suitable adhesive or by a suitable array of rivets 62a. With this construction, the rolls will have smooth surfaces, but the spirals will be comparatively rough surfaced and capable of holding an onion in the trough between the rolls and moving it in the trough between the rolls and rearwardly over the table.

Figure 4:
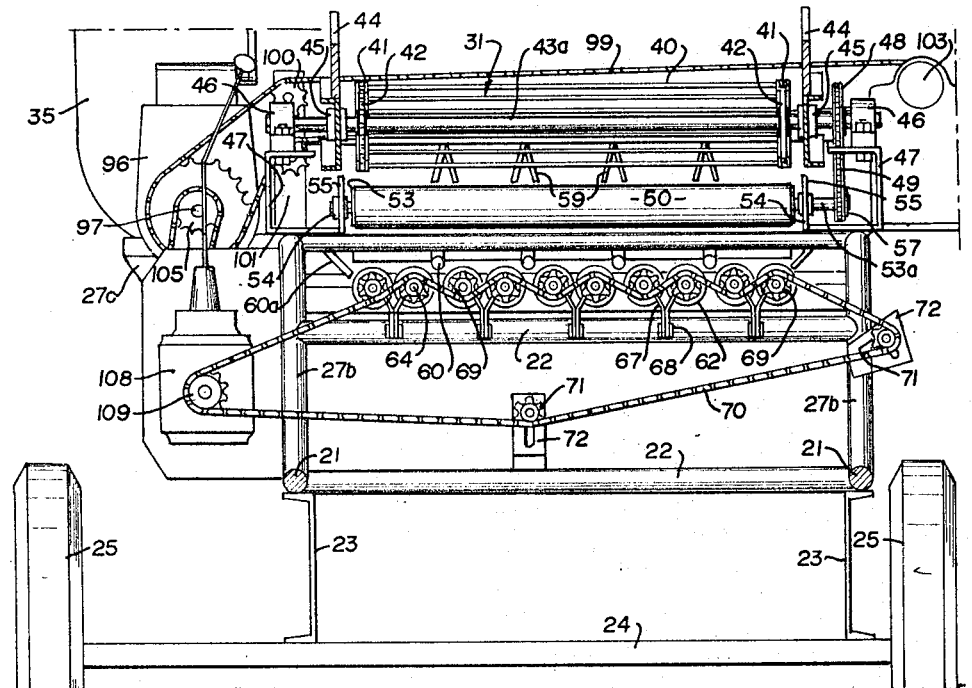
FIGURE 4 is a transverse sectional elevational view of driving mechanisms, as taken from the indicated line 4—4 at FIG. 1, but on an enlarged scale.
Figure 5:
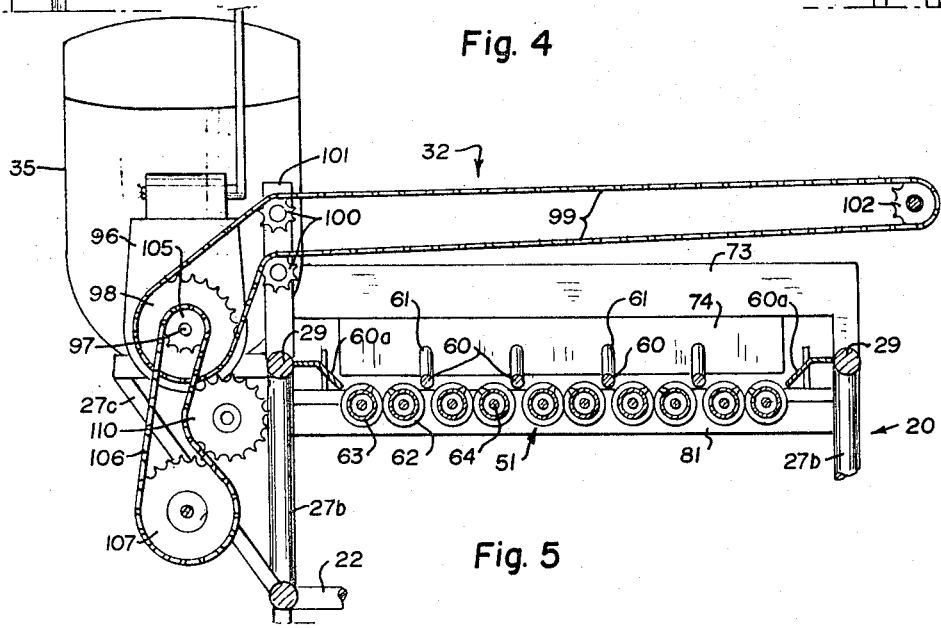
FIGURE 5 is a transverse sectional elevational view as taken from the indicated line 5—5 at FIG. 1 but on an enlarged scale.

The bearing 65 at the forward end of the shaft 64 is carried on an arm 67 which is mounted in a bracket 68 on a transverse frame member 22 below the end of the rolls or is welded into position on the frame. Each arm is thus held in position in conjunction with the corresponding arm of a mating roll, such being a convenient arrangement for holding the array of rolls in position. The forwardly extended end of each shaft 64 extends beyond the bearing 65 to support a sprocket 69, and the sprockets 69 for the array of rolls lie in a common plane to connect with a transversely disposed chain 70. This chain is wound about the sprockets 69 in an alternating over-under array, FIG. 4, to effect opposite rotation of adjacent rolls by movement of the chain. The chain 70 extends to a driver, hereinafter described, and is held in position by idler sprockets 71 at the opposite side of the frame and at a return reach of the chain below the sprockets 69. Each idler sprocket 71 is mounted upon an adjusting bracket 72 to vary the tightness of the chain, all in a conventional manner.

A bridge 73 carrying a skirt 74 extends transversely across the table 32 near the rear quarter point of the table. The skirt is resilient and pliable, with its lower edge being adjacent to the rolls; hence, the onions carried in the roll troughs will contact the skirt. The effect of this skirt is to better align the bulbs within the troughs and to facilitate swinging the tops of any onions not already so positioned to a rearward trailing direction with respect to the bulb to thus force these tops into the troughs between the rolls and assure their being pulled downwardly and between the rolls.

The bearings 65 at the trailing end of the rolls 51 are mounted within enclosure shells 75, which overlie the bearings as plate-like members. Each shell 75 encloses two adjacent bearings which are of different pairs of rolls, with the edges of each shell being rolled downwardly as a plate-like cover so that a space 76 is provided between adjacent shells. This space 76 forms a continuation of the trough between each pair of rolls. It follows that movement of an onion held in the trough between the rolls, with its top extending downwardly through the trough, will be continued into the space 76 when the onion leaves the rolls. The sickle 52 lies in this space 76 and thus severs the top from the bulb. To provide for operative clearances, the array of shells 75 is supported by a bridge 77, mounted upon uprights 78, and extended transversely over the trailing end of the finishing table. Suitable arms 79 depend from the bridge to connect with the shells 75, and also to hold the rearward ends of the deflector rods 60.

The bearings 65 are supported in the shells by hooked fingers 80, which are wrapped about the undersides of the bearings. The shells extend rearwardly from the bearings a distance sufficient to enclose the sickle 52 with its teeth projecting into the spaces 76. The sickle 52 is mounted upon a base angle 81 secured to the frame and extending transversely thereacross rearwardly of the sickle. This angle 81 holds a retainer strip 82, wherein the sickle is mounted. The sickle includes a pair of toothed lapping plate-like bars, a lower bar 83 secured to the base angle, and an upper bar 84 slidably mounted thereon, to reciprocate for cutting in a conventional manner.

The upper sickle bar 84 is reciprocated by a connecting rod 85 having one end pivotally secured to a lug 84a on the plate 84 and the other end mounted on the crankpin of a flywheel 86. This flywheel is carried on a shaft 87, mounted in bearings 88 secured to a platform 89 outstanding from the side of the frame 20. This shaft 87 connects with a drive shaft which extends forwardly alongside the frame and to the engine 35, as will be described.

It is to be noted that the flywheel 86 balances the apparatus to a certain extent, but the reciprocating movement of the sickle bar 84 and connecting rod cannot be compensated for and such movement creates a vibration through the apparatus, which will be discussed further.

The base angle 81 carrying the sickle 52 also supports the sacking chute 33, a rearwardly inclined plate 90 having upstanding, converging sidewalls 91 outstanding from and terminating at the rearward edge of the plate 90. As illustrated, this sacking chute is a two-sack unit, with a rectangular sack supporting rack 92 extending beyond the lower discharge end of the chute. Suitable hooks 93 are provided on this rack for holding two sacks 54. A splitter 94 is mounted in the chute as upon a centrally positioned pivot 95 at its discharge end thereof to extend forwardly upon the plate 90 and to swing from one side to another to direct onions from one sack to another. Thus, an operator on the machine can remove and replace the sacks at one side of the rack while the sack at the other side of the rack is being filled with onions.

The drive for this apparatus is shown in the various figures and is exemplified diagrammatically at FIG. 10. The engine 35 is a conventional gasoline powered unit, having a suitable clutch 96 and a drive shaft 97 extending therefrom. A first sprocket 98 is connected to this drive shaft to hold a chain 99 which extends upwardly about idler sprockets 100 mounted upon a rod 101 upstanding from a frame member. The chain 99 extends transversely across the machine to connect with a sprocket 102 on the shaft of a worm gear reducer 103. The output shaft of the worm gear reducer carries a sprocket 104 about which the chain 49 extends and connects with sprockets 48 and 57 to drive the conveyor 31 and transport belt 50 hereinbefore described.

A second sprocket 105 is connected to the engine drive shaft 97 to carry a chain 106 which extends downwardly to connect with a sprocket 107 mounted on the input shaft of a shifting transmission 108. The output shaft of this transmission carries another sprocket 109 which connects with the roll drive chain 70, heretofore described.

This sprocket 109 is preferably a slip clutch sprocket combination of any conventional type which will ordinarily operate under normal load but which will slip if the loading becomes excessive. Such could occur as when a board or a rock would accidentally jam a pair of rolls and prevent their turning.

The chain 106 between the drive shaft 97 and the transmission sprocket 107 also connects with a third sprocket 110, which is mounted upon a rearwardly extending shaft 111, and this shaft is connected to the shaft 87 of the sickle cutter by a universal joint 112.

The sprocket 110 is preferably a slip clutch sprocket combination which is adapted to permit the shaft 111 to rotate under a normal load but to slip if the load becomes excessive, as when the sickle cutter 52 gets jammed.

In the operation of this apparatus, onions are moved up the conveyor 31, dropped onto the transport belt 50 and thence to the rolls. The comb 58 effectively turns most onions in such a manner as to permit the tops to be pulled through the troughs between a pair of rolls 51 whereon they may fall. The onions are moved rearwardly in these troughs by the opposing spirals of the rolls 51, the spirals of each pair acting in unison as the rolls rotate. As they complete the rearward movement across the table, the tops are severed and the finished onions fall onto the sacking chute, as heretofore described. While this operation provides for a novel and unique mode of harvesting onions, a further advantage is realized and attained by the manner in which the apparatus is constructed and arranged. The rolls 51 are made of a comparatively thin-wall tubing 63, centered on a shaft by discs 66 at each end. It was discovered that these tubes would vibrate responsive to movement of the apparatus, and especially the rapid reciprocation of the sickle 52 and connector rod 85. A small vibration of the rolls at a frequency between approximately 10 to 100 cycles per second occurs, depending upon the rigidity of the tubes 63 sufficient to induce a rapid shaking of the onions as they move along the troughs without actually disturbing the onions. This shaking action will remove any mud or dirt on the onions and effectively clean them. This is especially desirable when the ground is wet and muddy, as where an early onion harvest is necessary because of excessively wet weather. It was also discovered that a double-bulb onion would invariably split apart by the action of the rolls 51 thus avoiding tedious hand-sorting operations. Moreover, the downward rotation of the rolls pulls undersized, soft and spoiled onions through the troughs to complete an effective culling out of undesirable plants.

I have now described my invention in considerable detail. However, it is obvious that others skilled in the art can devise and build alternate and equivalent constructions which are nevertheless within the spirit and scope of my invention. Hence, I desire that my protection be limited not by the constructions illustrated and described but only by the proper scope of the intended claims.

I claim:

1. An onion harvesting apparatus comprising, in combination with a vehicle adapted to move the apparatus across a field along a row of onions:
    (a) a digger leading the apparatus adapted to dig onions from the ground as the apparatus is moved along the row;
    (b) a conveyor behind the digger adapted to receive onions as they are dug and to convey them upwardly and rearwardly from the digger for deposit of onions therebeyond;
    (c) a transport belt adapted to receive onions dropped from the conveyor and to move the same thereover across a longitudinal path and generally rearwardly with respect to the machine;
    (d) a transverse array of finger means disposed transversely over the belt reaching downwardly towards the belt and being adapted to shift the onions to selected lateral positions and turn the tops of the onions in a direction trailing their direction of movement on the transport belt, whereby to orient the onions for further positioning;
    (e) a finishing table rearwardly of the transport belt having an array of pairs of longitudinally-disposed, closely-spaced, spiralled rolls, with each pair adapted to rotate in mutual opposition with the top surfaces thereof moving towards each other to move the onions dropping onto the rolls into the troughs between the pairs and to pull the onion tops downwardly into the space between the rolls and with the spirals directed to slide the onions along the rolls toward the rearward end thereof;
    (f) a cutter means at the rearward end of the table disposed below the normal onion position on the rolls adapted to sever depending tops from the onion plants as they move from the finishing table; and
    (g) a chute means at the rearward end of the table adapted to receive the topped onions.

2. In the organization set forth in claim 1, including: longitudinally disposed rods above the spaces between the adjacent rolls of adjacent pairs to deflect onions and the stem portions thereof into the trough portions between the rolls of each pair; and wherein:
    said finger means are spaced transversely over the aforesaid transport belt at a spacing which is substantially in alignment with said rods.

3. An onion harvesting apparatus comprising, in combination with a vehicle adapted to move the apparatus across a field along a row of onions:
    (a) a digger leading the apparatus adapted to dig onions from the ground as the apparatus is moved along the row;
    (b) a conveyor behind the digger adapted to receive onions as they are dug and to convey them upwardly and rearwardly from the digger for deposit of onions therebeyond;
    (c) a transport means adapted to receive onions dropped from the conveyor and to move the same thereover across a longitudinal path and generally rearwardly with respect to the machine;
    (d) means disposed transversely over the transport means adapted to shift the onions to selected lateral positions and turn the tops of the onions in a direction trailing their direction of movement on the transport means, whereby the onions are oriented for further positioning;
    (e) a finishing table rearwardly of the transport means having an array of pairs of longitudinally-disposed, closely-spaced, spiralled rolls, with each pair adapted to rotate in mutual opposition with the top surfaces thereof moving towards each other to move the onions dropping into the rolls in to the troughs between the pairs and to pull the onion tops downwardly into the spaced between the rolls and with the spirals directed to slide the onions along the rolls toward the rearward end thereof, said spirals being formed of resilient material:
    (f) a cutter means at the rearward end of the table disposed below the normal onion position on the rolls adapted to sever depending tops from the onion plants as they move from the finishing table; and (g) a chute means at the rearward end of the table adapted to receive the topped onions.

4. In the organiaztion set forth in claim 3 wherein each roll is formed as a member supported at each end having a moderate degree of flexibility between the supports and being adapted to vibrate transversely at frequencies in the approximate range of 10 to 100 vibrations per second responsive to the movements of the apparatus, and being thereby adapted to shake onions thereon sufficiently as to ease their movements along the rolls and to facilitate cleaning them of soil.

5. In the organization set forth in claim 4 wherein said cutter means comprises a transversely oriented, reciprocable, serrated blade on the apparatus frame, a transversely extended crank mechanism adapted to reciprocate the blade, and means adapted to drive the same at velocities sufficient to vibrate the rolls.

References Cited

UNITED STATES PATENTS

| 1,635,569 | 7/1927 | Ayars | 171—36 X |
| 2,102,379 | 12/1937 | Nutter | 171—36 X |
| 2,531,379 | 11/1950 | Chickering | 171—36 X |

ANTONIO F. GUIDA, *Primary Examiner.*

UNITED STATES PATENT OFFICE
CERTIFICATE OF CORRECTION

Patent No. 3,451,485                                     June 24, 1969

Frank C. James

It is certified that error appears in the above identified patent and that said Letters Patent are hereby corrected as shown below:

In the heading to the printed specification, lines 3 and 4, "Frank C. James, Salem, N. Mex., assignor to Wyolt Corporation, Cheyenne, Wyo., a corporation of Wyoming" should read -- Frank C. James, P. O. Box 14, Salem, N. Mex. 87941 --. Column 8, line 65, "into" should read -- onto --; line 67, "spaced" should read -- space --.

Signed and sealed this 21st day of April 1970.

(SEAL)
Attest:

Edward M. Fletcher, Jr.                          WILLIAM E. SCHUYLER, JR.
Attesting Officer                                      Commissioner of Patents